US006202243B1

(12) United States Patent
Beaufoy et al.

(10) Patent No.: US 6,202,243 B1
(45) Date of Patent: Mar. 20, 2001

(54) SURFACE CLEANING MACHINE WITH MULTIPLE CONTROL POSITIONS

(75) Inventors: Jeffrey John Beaufoy, Prior Lake; Kevin LeRoy Shinler, North Branch, both of MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 09/320,150

(22) Filed: May 26, 1999

(51) Int. Cl.[7] .............................. A47L 11/16; A47L 11/40
(52) U.S. Cl. ........................... 15/49.1; 15/339; 15/340.1; 15/410
(58) Field of Search ................................ 15/49.1, 78, 320, 15/339, 340.1, 410

(56) References Cited

U.S. PATENT DOCUMENTS

| | | | |
|---|---|---|---|
| 3,198,030 | * | 8/1965 | Miller et al. . |
| 3,720,423 | * | 3/1973 | Morris . |
| 3,833,961 | * | 9/1974 | Fortman et al. . |
| 4,624,026 | * | 11/1986 | Olson et al. . |
| 4,819,676 | * | 4/1989 | Blehert et al. . |
| 5,276,933 | * | 1/1994 | Hennessey et al. . |
| 5,346,028 | * | 9/1994 | Cassano . |
| 5,813,679 | * | 9/1998 | Hobrath . |
| 5,845,724 | * | 12/1998 | Barrett . |

\* cited by examiner

*Primary Examiner*—Randall E. Chin
(74) *Attorney, Agent, or Firm*—Cook, Alex, McFarron, Manzo, Cummings & Mehler, Ltd.

(57) ABSTRACT

A surface cleaning machine includes a chassis, wheels for supporting the chassis and a motor for moving the chassis. There are cleaning implements mounted on the chassis and there is a steering mechanism for use by an operator for directing movement of the chassis. The steering mechanism includes an operator movable control assembly and a coupling connected to it for causing turning movement of one or more of the chassis wheels. The chassis includes a first mount for the control assembly and a drive connection between the first mount and the coupling. The chassis includes a second mount for the control assembly and a drive connection between the second mount and the coupling. There is an operator manipulable attaching element for connecting the control assembly to either the first mount whereby the operator may drive the machine from a position seated upon the chassis or to the second mount whereby the operator may drive the machine from a position walking behind the chassis.

11 Claims, 6 Drawing Sheets

SURFACE CLEANING MACHINE WITH MULTIPLE CONTROL POSITIONS

THE FIELD OF THE INVENTION

The present invention relates to surface cleaning machines, for example a vacuum sweeper for outdoor use which has counter rotating brushes to sweep debris into a central area from which a vacuum head picks up the debris and deposits it in a hopper. The invention should not be limited to this specific machine, but the invention will be described in connection with a surface cleaning apparatus of this type.

The vacuum sweeper, which is to be described, is capable of picking up litter in such places as city centers, malls, sidewalks and the like and customarily, this type of operation will take place with the operator walking behind the machine. The machine also may be driven with the operator seated upon it which will enable the machine to move at an accelerated speed from one area to another. In particular, the invention provides a surface cleaning machine, whether it be sweeper or scrubber, in which the operator may drive and control the machine from one of two independent and distinct positions. The machine may be driven with the operator seated upon its chassis or the machine may be driven with the operator walking behind it. The steering and speed control mechanism is pivotally movable on the chassis from a position in which it is mounted for seated control by the operator or movable to a second position in which it is mounted for control by the operator from behind the machine.

SUMMARY OF THE INVENTION

The present invention relates to surface cleaning machines and particularly to such a machine which may be manipulated from one of two control positions.

A primary purpose of the invention is to provide a simply constructed reliably operable surface cleaning machine in which the operator may drive the machine from a sitting position, or from a walk-behind position.

Another purpose of the invention is to provide a sweeping machine of the type described which includes a steering and speed control mechanism which is pivotally movable on the chassis from a first position in which the mechanism is used by a sitting operator and a second position in which the mechanism is used by an operator standing behind the machine.

Another purpose is a surface cleaning machine, for example, a vacuumized sweeper, in which the steering and speed control mechanism is pivotally mounted on the machine chassis and may be connected, by the operator, to a first mount on the forward part of the machine, or to a second mount on a rear portion of the machine, thereby providing multi-position control of the machine by an operator.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
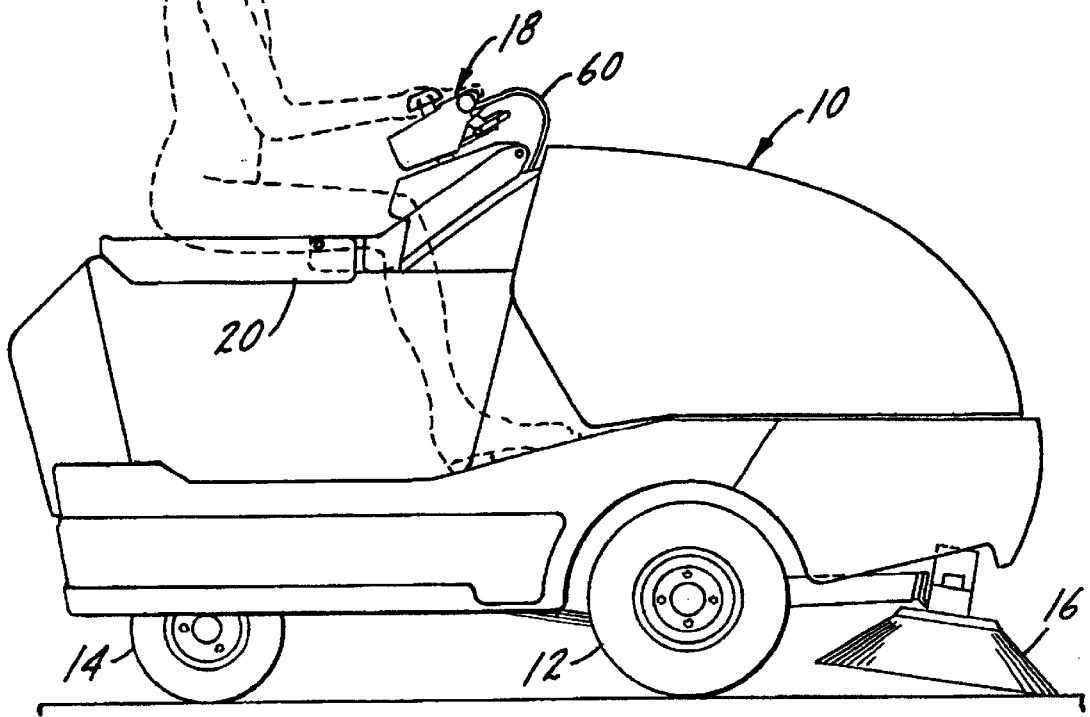
FIG. 1 is a side view of a surface cleaning machine of the type described, showing the control mechanism in a first position.
Figure 2:
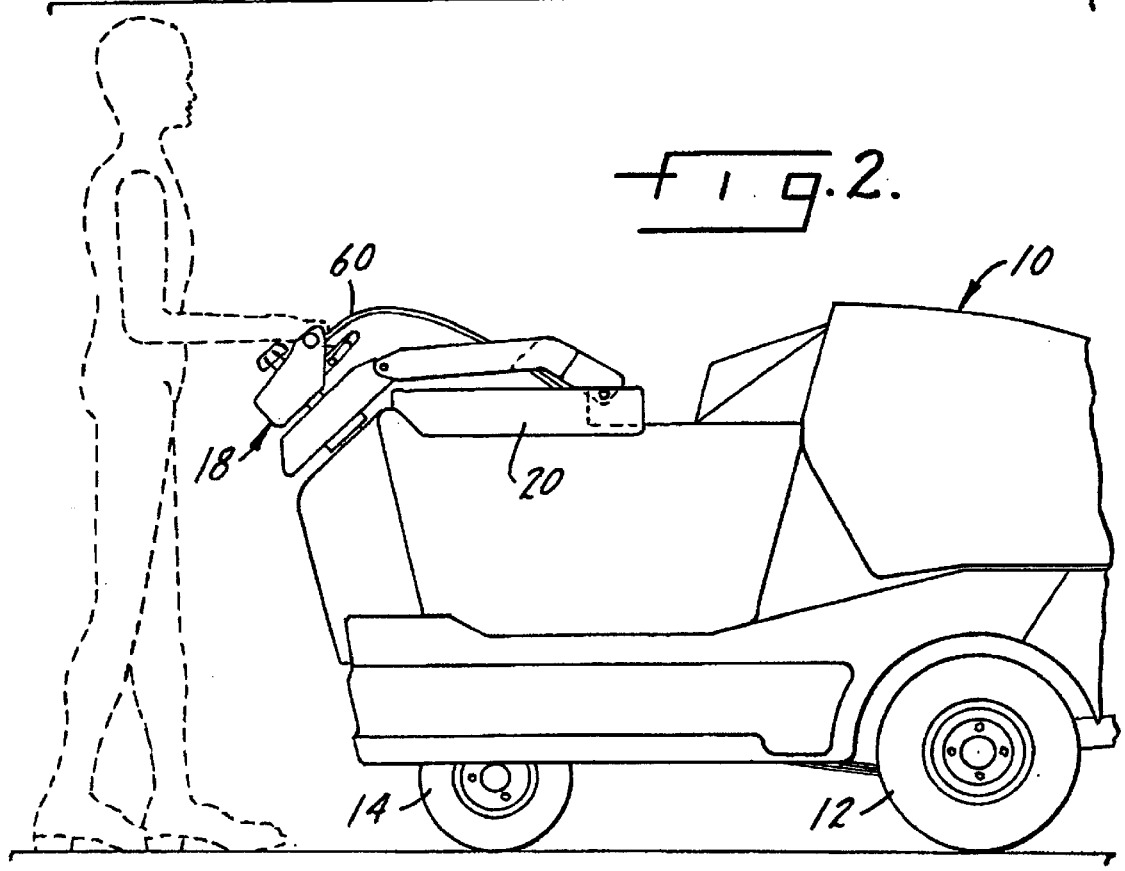
FIG. 2 is a side view, similar to FIG. 1, but showing the control mechanism in a second position.

The surface cleaning machine includes a chassis indicated generally at 10, which is supported on forward drive wheels 12 and rear steering wheels 14. There are counter-rotating disc cleaning brushes 16 mounted toward the forward end of the chassis and the chassis, as is conventional in this art, will include drive motors for the brushes and a motor for moving the machine. Controls for both the brushes and for driving the machine are a part of an operator console which is indicated generally at 18 in FIG. 1. FIG. 1 shows the operator, in phantom, upon a seat 20 on the chassis. The control console or drive console 18 is in the forward position for driver seated operation. FIG. 2 shows the machine with the drive console 18 moved to a rear position for use by an operator walking behind the machine. The drive console, which is a part of the steering and drive control assembly, is shown in more detail in the following figures.

Figure 3:
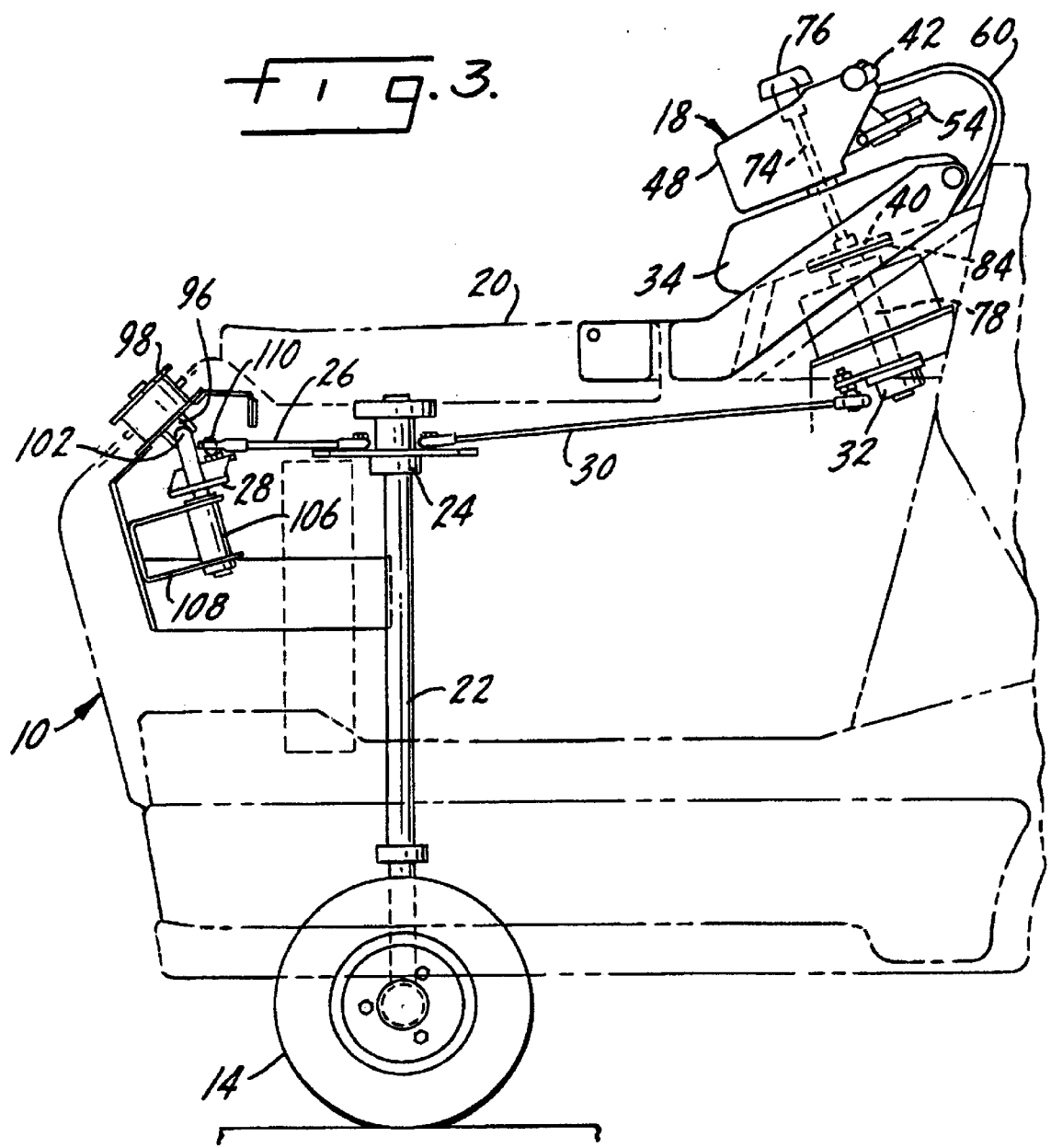
FIG. 3 is an enlarged side view, showing the machine chassis in outline, and illustrating the steering mechanism for multi-position control.
Figure 7:
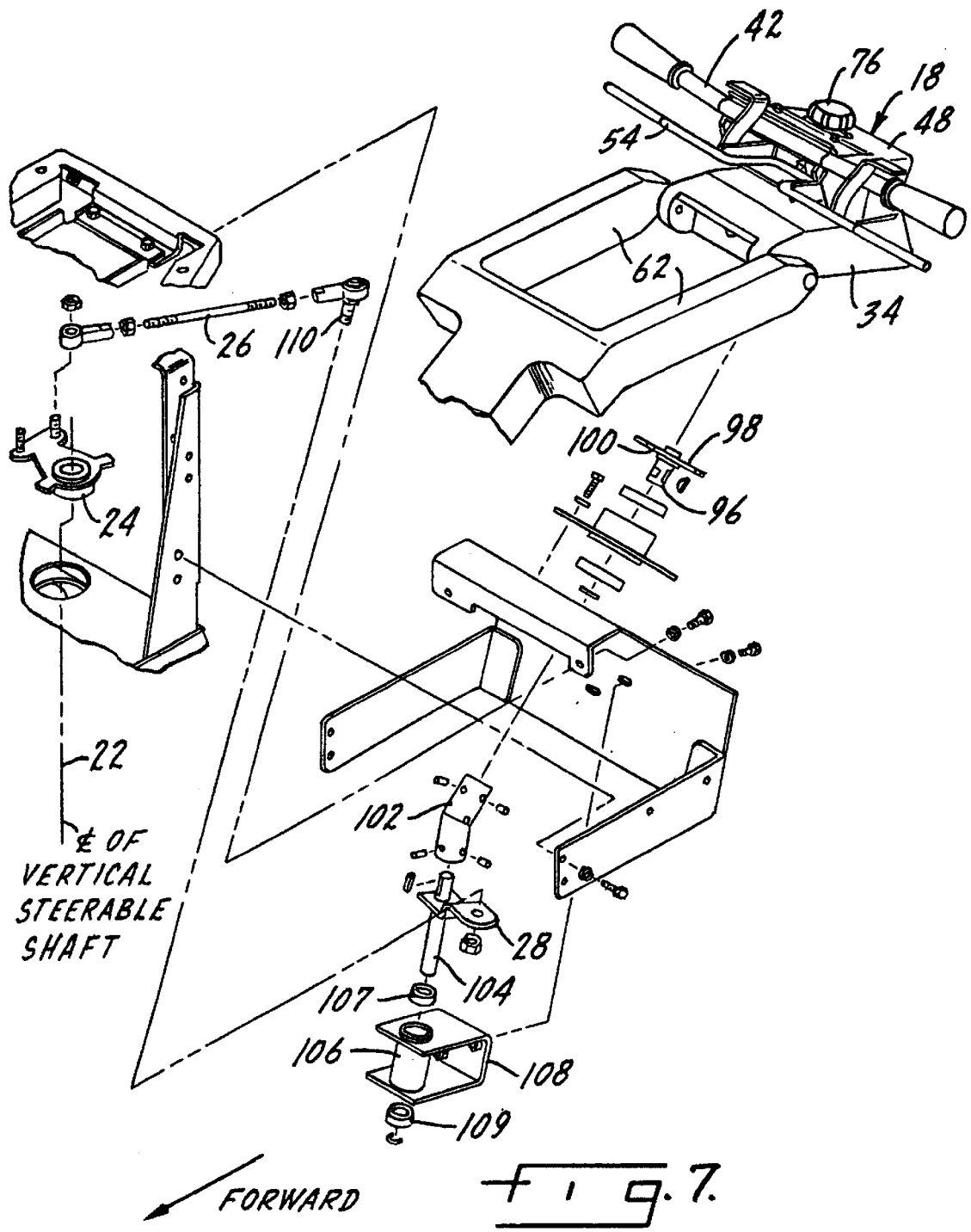
FIG. 7 is an exploded perspective illustrating the connection of the steering and speed control assembly to the rear or walk-behind coupling connection.

The steering mechanism is shown in detail in FIG. 3. The steerable wheels 14 may be turned by a vertically oriented shaft 22, rotation of which is controlled by a lever arm 24. The lever arm 24 is connected pivotally to a rear steering link 26, which is pivoted at its rearward end to a lever arm 28 (FIG. 7). The lever arm 24 is connected by forward steering link 30 to a front lever arm 32. Thus, the vertical shaft 22 may be rotated through the lever arm 24 by either the steering link 26 or the front steering link 30.

Figure 4:
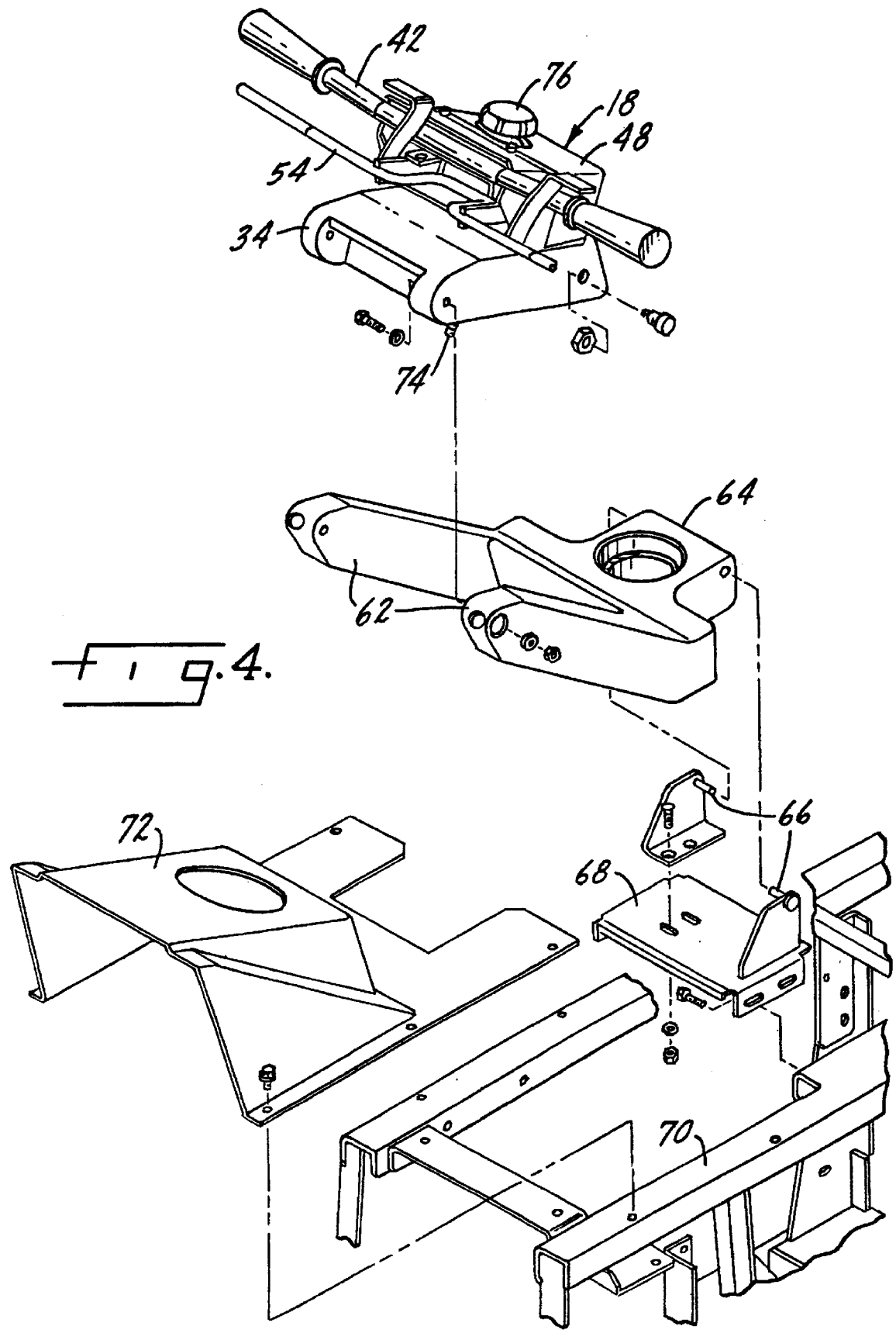
FIG. 4 is an exploded perspective illustrating the steering and speed control assembly and its pivotal mount to the machine chassis.
Figure 5:
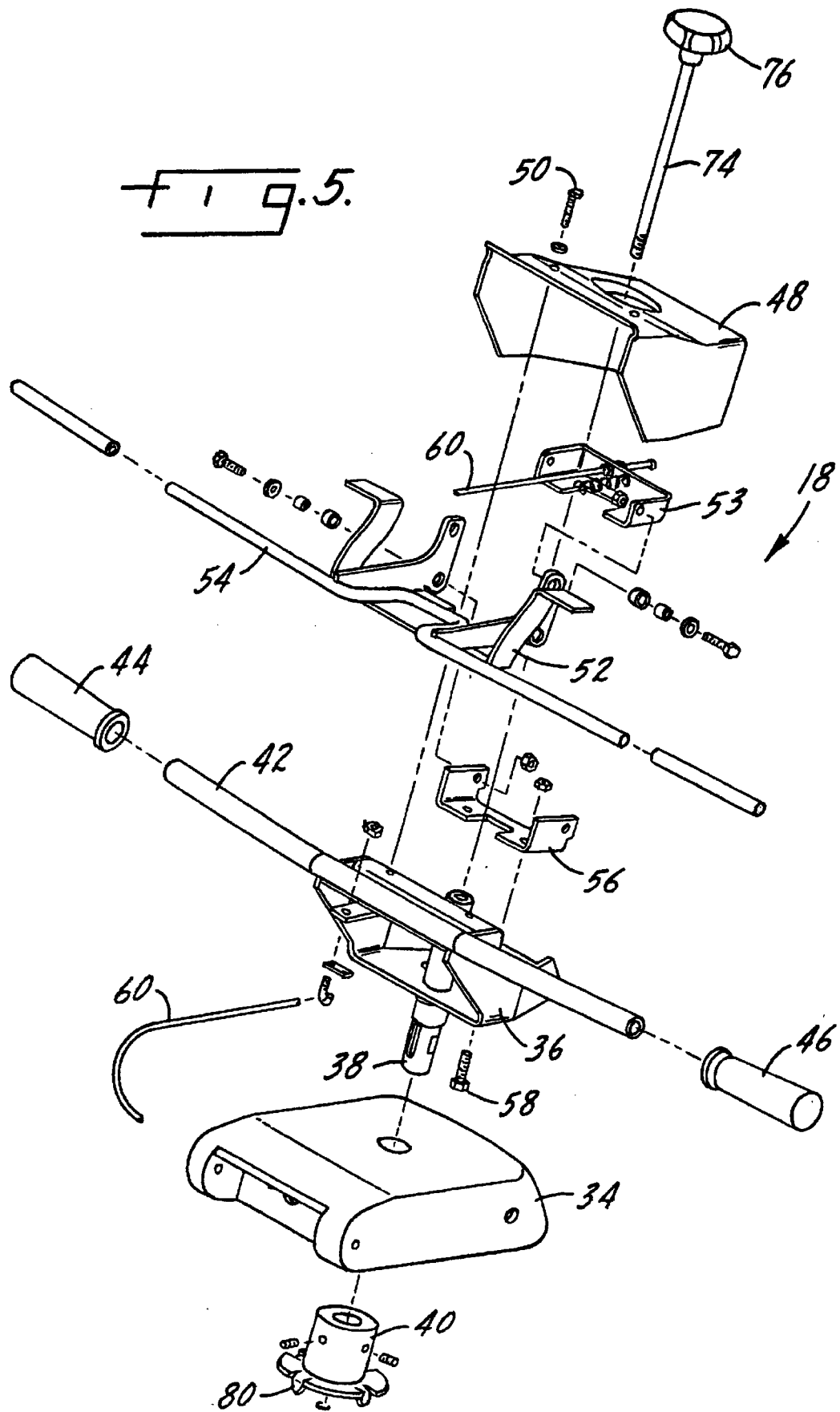
FIG. 5 is an exploded perspective of the steering and speed control assembly.

FIGS. 4 and 5 illustrate the control assembly and the control console. The console 18, comprising all the parts shown in FIG. 5, includes a base 34 upon which is pivotally mounted a bracket 36 having a shaft 38 secured to it and extending therethrough. The lower end of the shaft 38 is attached to a drive coupling element 40. The bracket 36 mounts the steering handlebar 42, having hand grips 44 and 46 at its opposite ends thereof, for manipulation by the operator in steering the vehicle. An upper cover 48 is attached by threaded fasteners 50 (only one of which is shown) to the lower bracket 36 and will rotate therewith. A speed control bell crank lever 52 is welded to a speed control arm 54 with these elements being pivotally mounted to a bracket 56 which in turn is mounted by fasteners 58 to the bracket 36. Thus, the speed control arm may be rocked toward and away from the steering handlebar 42, so that the operator may simultaneously control both speed and direction. A speed control cable 60 is pivotally attached to the bell crank lever 52 by bracket 53 such that movement of the speed control arm 54 will move the speed control cable 60 and thus govern the, speed of the vehicle as it is controlled by the operator.

As illustrated in FIG. 4, the console 18 described and shown in detail in FIG. 5, is pivotally mounted between a pair of arms 62 extending from a steering yoke 64. Yoke 64 in turn is pivotally mounted by pins 66 to a bracket 68 which will be mounted on a frame 70 forming a part of the vehicle chassis. A cover 72 will be mounted to the frame 70 as shown by the fasteners and dotted lines in FIG. 4. The control assembly with the console 18 pivotally mounted to the arms 62 will be mounted on the chassis as shown in FIGS. 1 and 2 so that the assembly may be moved by pivotal movement of yoke 64 between the forward FIG. 1 position and the rearward FIG. 2 position. Both yoke 64 and the steering console 18, will pivot when they are moved between the FIG. 1 and FIG. 2 positions.

Figure 6:
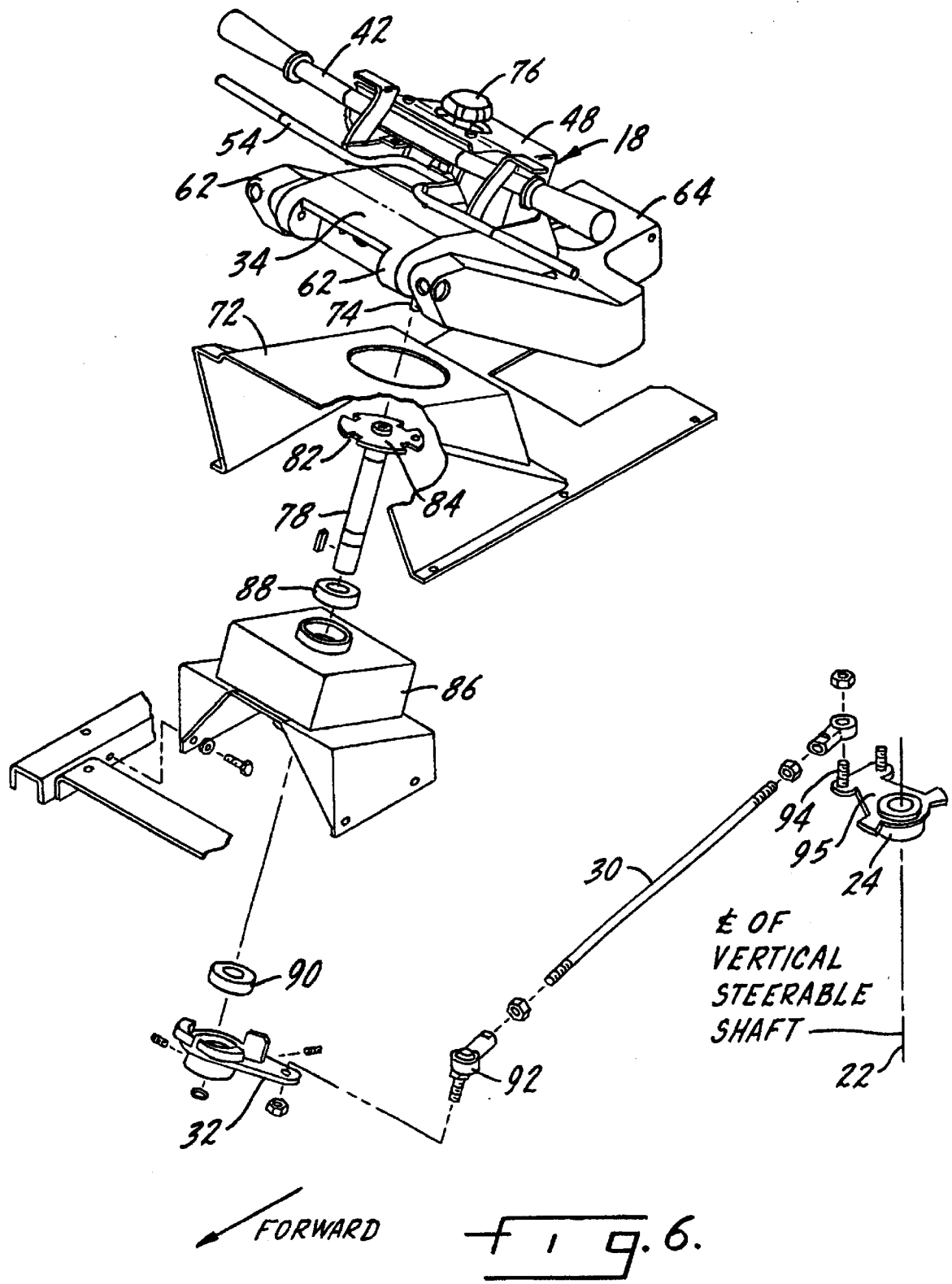
FIG. 6 is an exploded perspective illustrating the connection of the steering and speed control assembly and its connection to the drive coupling for the forward or driver seated operation.

The console 18 includes a threaded shaft 74 having a knob 76 which will extend downwardly through shaft 38, through the coupling element 40 for threaded attachment to either the front drive shaft 78 or rear drive shaft 96, depending upon whether the console is mounted for front or for rear drive. FIG. 6 illustrates the connection for a front drive. The threaded rod 74 will thread into the top of shaft 78 when the operator desires to physically attach the control assembly to the front mount. The coupling element 40 has a plurality of tabs 80 which will interlock with notches 82 in the disc 84 which is attached to the top of shaft 78. In this manner, rotation of the steering handlebar 42 will turn shaft 38, coupling element 40 and thus shaft 78.

As shown in FIG. 6, shaft 78 extends through a housing 86, upper and lower bearings 88 and 90 to the forward lever arm 32. Arm 32 is pivotally connected, by a ball joint 92 to the front steering link 30, and the link 30 in turn is pivotally attached by a threaded stub shaft 94 to the lever portion 95 of lever arm 24. Accordingly, when the drive assembly and the drive console are in the forward mount position of FIG. 1, turning of the steering handlebar 42, through the above described mechanism, will rotate the vertical shaft 22 for steering control of the turning wheels 14. Speed control is provided by arm 54 connected to cable 60 which has sufficient slack to operate from either the front or rear position.

FIG. 7 illustrates the connection when the drive console and the drive assembly are in the rear mount position of FIG. 2. In this instance, the rod 74 and the knob 76 will have first been manipulated by the operator to release the connection of the drive assembly to the front mount and to permit the control assembly to pivot as described earlier to the rear mount position. Threaded rod 74 will then be inserted through the same portions of the drive console and will thread into a shaft 96 which has a disc 98 with notches 100 which will interact with the coupling element 40 and its tabs 80 in the same manner as described in connection with the front mount. A universal joint 102 will connect the shaft 96 to a further shaft 104 which is journaled in a sleeve 106 having an upper and lower bearings 107 and 109 within a bracket 108. Shaft 104 mounts the rear lever arm 28 as shown particularly in FIG. 7. Again, turning movement of the steering handlebar 42 will cause rotation of shaft 104 through the above-described mechanical connections to turn the lever arm 28 in consort with turning movement of handlebar 42. Lever arm 28 is pivotally connected by a threaded fastener 110 to the rear steering link 26, shown in FIG. 3. Thus, rotation of the steering handlebar when the drive console and the drive assembly are in the rear mount position, and attached thereto by the threaded rod 74, effectively rotates the vertical turning shaft 22.

Of importance in the invention, is the use of a single control console and control assembly which is pivotally movable by a pivotally mounted yoke between forward and rear positions. In each such position, the operator may physically attach the control assembly to the drive elements which permit the assembly to be functional at that mounted location on the chassis. This provides a means whereby the operator may ride the machine and drive it or he may walk behind and drive it, and in each case the same control console, same control assembly and the same vertical turning shaft are utilized. It is only that the console is moved between one position or another position, and physically attached in either position by the operator which provides the alternate control positions to drive and steer the surface cleaning machine.

Whereas the preferred form of the invention has been shown and described herein, it should be realized that there may be many modifications, substitutions and alterations thereto.

The embodiments of the invention in which an exclusive property or privilege is claimed are defined as follows:

1. A surface cleaning machine including a chassis, wheels for supporting said chassis, cleaning implements mounted on said chassis for operating upon a surface to be cleaned, a steering mechanism for use by an operator for directing movement of the chassis, said steering mechanism including an operator movable control assembly and a coupling connected to and for causing turning movement of one or more of said wheels, said chassis including a first mount for said control assembly and a drive connection between said first mount and said coupling, said chassis including a second mount for said control assembly and a drive connection between said second mount and said coupling, an operator manipulable means for connecting said control assembly to either said first mount whereby the operator may drive the machine from a position seated on the chassis or to said second mount whereby the operator may drive the machine from a position walking behind the chassis.

2. The surface cleaning machine of claim 1 wherein said operator manipulable means includes a releasable element for attaching said control assembly to either said first mount or said second mount.

3. The surface cleaning machine of claim 2 wherein said releasable element includes an operator accessible handle and a shaft.

4. The surface cleaning machine of claim 3 wherein said shaft is threaded and said first mount and said second mount have threaded openings for receiving said shaft.

5. The surface cleaning machine of claim 1 wherein said control assembly is pivotally mounted on said chassis for movement between a position in which it is connected to said first mount or to a position in which it is connected to said second mount.

6. The surface cleaning machine of claim 5 wherein said control assembly is pivotally mounted to said chassis between said first mount and said second mount.

7. The surface cleaning machine of claim 6 wherein said control assembly includes a pair of arms and a console, said arms being pivotally mounted to said chassis and to said console.

8. The surface cleaning machine of claim 7 wherein said control assembly includes a speed control element and a steering element, with said elements being located adjacent one to the other for simultaneous use by an operator.

9. The surface cleaning machine of claim 1 wherein said steering mechanism includes a generally vertically oriented rotatable shaft, said coupling being mounted to said shaft.

10. The surface cleaning machine of claim 9 wherein the drive connection between said first said mount and said coupling includes a link pivotally connected to said coupling and to said first mount and wherein the drive connection between said coupling and said second mount includes a link pivotally connected to said coupling and to said second mount.

11. The surface cleaning machine of claim 10 wherein said vertically oriented shaft is located generally midway between said first mount and said second mount.

* * * * *